United States Patent [19]
Allaria

[11] 3,725,970
[45] Apr. 10, 1973

[54] DEVICE FOR REMOVABLY HOLDING A VEHICLE WINDSHIELD WIPER ON THE WINDSHIELD WIPER ARM

[75] Inventor: Eugenio Allaria, Milano, Italy

[73] Assignee: Fabbrica Italiana Magneti Marelli S.p.A., Milano, Italy

[22] Filed: Jan. 11, 1971

[21] Appl. No.: 105,264

[30] Foreign Application Priority Data

Jan. 12, 1970  Italy..................................19252 A/70

[52] U.S. Cl...............................................15/250.32
[51] Int. Cl. ...................................................B60s 1/40
[58] Field of Search......................15/250.32, 250.31, 15/250.34

[56] References Cited

UNITED STATES PATENTS

| | | | |
|---|---|---|---|
| 2,752,626 | 7/1956 | Oishei | 15/250.32 X |
| 2,915,770 | 12/1959 | Scinta | 15/250.32 |
| 2,932,843 | 4/1960 | Zaiger et al. | 15/250.32 |
| 3,049,743 | 8/1962 | Graczyk et al. | 15/250.32 |
| 3,621,507 | 11/1971 | Allaria et al. | 15/250.32 |

Primary Examiner—Peter Feldman
Attorney—Ostrolenk, Faber, Gerb & Soffen

[57] ABSTRACT

Device for joining the windshield wiper blade to the wiper arm including a pivotable latch that pivots to snap into place to lock the wiper arm into position and that pivots in another direction to release the wiper arm.

8 Claims, 9 Drawing Figures

PATENTED APR 10 1973 3,725,970
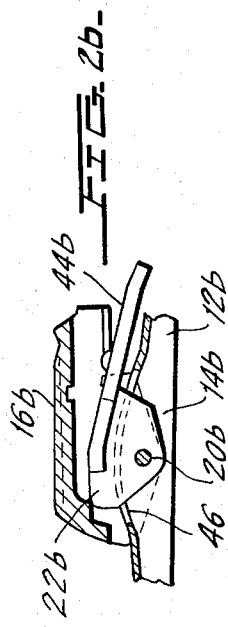
FIG.1b.
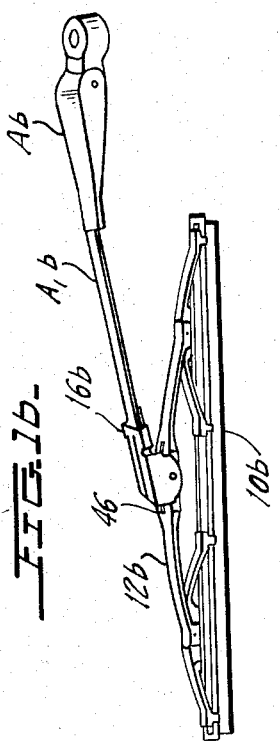
FIG.1.
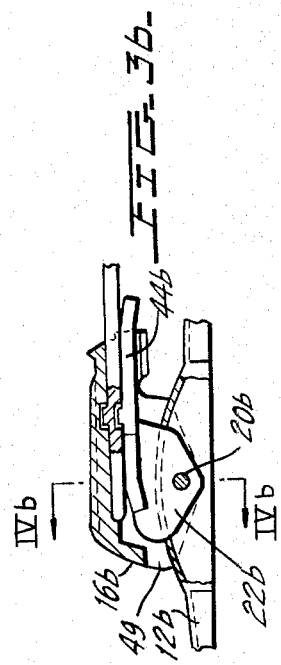
FIG.2b. FIG.3b.
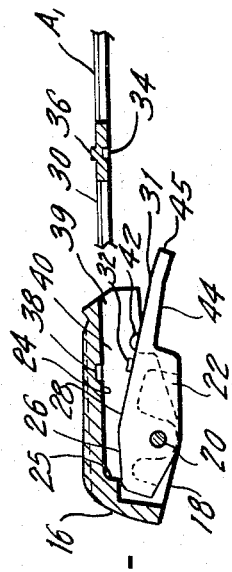
FIG.2. FIG.3.
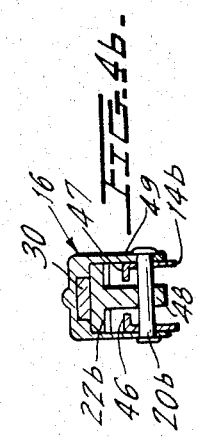
FIG.4b.
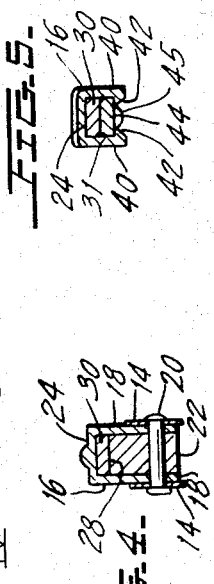
FIG.5.
FIG.4.
INVENTOR.
EUGENIO ALLARIA
BY
Ostrolenk, Faber, Gerb & Soffen
ATTORNEYS

DEVICE FOR REMOVABLY HOLDING A VEHICLE WINDSHIELD WIPER ON THE WINDSHIELD WIPER ARM

The present invention relates to a device for removably holding the wiper blade on an automobile windshield wiper arm. An oscillating windshield wiper arm has a wiper blade attached at its end, which should be simply and rapidly both removable from and attachable to the arm without detrimentally affecting the operation of, or the adherence of the wiper to the windshield.

To satisfy these requirements, between the arm and the wiper joint of a known windshield wiper is provided a number of parts and an elastic member for holding the wiper arm within the housing, which receives an end of the arm. These joints are complicated and expensive to make and, as a result of the presence of the elastic member, they fail to assure the proper operating conditions.

The object of the invention is to provide a new, effective device for removably fastening a wiper blade to a wiper arm.

It is a further object for the device to comprise only a few parts, be low in cost and be made of plastic to avoid all noise during operation.

The device of the invention includes a box-like body with an opening into which the arm of the windshield wiper is inserted. A block is housed at least in part between the box body and wiper arm engagement surfaces, and it is combined with resilient locking members, which hold the block in position to clamp the end of the arm of the windshield wiper against an interior wall of the box-like body.

In one advantageous embodiment of the device, the block consists, at least in part, of elastically deformable material, pivotally connected to the box-like body in such a manner that its engagement surface clamps the end of the wiper arm against the interior wall of the body.

In order to assure the proper mutual positioning of the wiper arm and the wiper blade, mating elevations and seats are provided between the facing surfaces of the parts of the device.

The invention will now be explained by the following description of the accompanying drawings, which show two embodiments of the invention as applied to the arm of an ordinary windshield wiper.

In the drawings:

FIG. 1 is a side view of a windshield wiper arm;

FIG. 2 is a longitudinal sectional view of the end of the wiper arm, with the device in accordance with the invention shown in open position;

FIG. 3 is a view as in FIG. 2, with the device in the engaged or closed position;

FIGS. 4 and 5 are cross-sections along the lines IV—IV and V-V respectively of FIG. 3.

FIGS. 1b, 2b, 3b and 4b correspond to FIGS. 1 to 4, but refer to another embodiment of the device.

In the various figures, corresponding parts are indicated by the same numbers. In the variant shown in FIGS. 1b, 2b, 3b and 4b, the corresponding parts are indicated with the same numbers followed by the letter b.

Referring to FIGS. 1 to 4, wiper arm A is provided with wiper B. The elastic blade 10 of wiper B cooperates with the surface of the vehicle windshield and is held in the wiper in known manner by a supporting frame 12. At its central part, frame 12 has bored walls 14, which can be formed from the longitudinal walls of the frame itself. The central part of frame 12 is provided with a central opening between walls 14, which houses a box-like body 16, one of the transverse walls of which has an opening for the insertion of shaft $A_1$ of arm A. The longitudinal walls 18 of body 16 have openings for the passage of pin 20, which pivotally connects body 16 to walls 14 of frame 12 and, therefore, pivotally connects wiper B to arm A.

Within body 16 is housed block 22 of generally prismatic shape. This block serves to latch the wiper arm to the wiper blade, as described below. Block 22 is connected to body 16 by pin 20, which passes into a hole provided in a suitable position therein and which permits block 22 to pivot properly. Block 22 is most effective when it is comprised of a resilient material.

Opposite back wall 24 of body 16, block 22 has two contiguous flat surfaces 26 and 28, which meet at an angle of less than 180° and cooperate with abutment 25 to limit the pivoting of block 22. Surface 28 is placed such that when the device is closed (see FIG. 3), surface 28 is parallel to and suitably spaced from end wall 24 in order to elastically clamp the end 30 of shaft $A_1$ between surface 28 and wall 24.

Surface 26 cooperates at its free end with abutment 25, which abutment both determines the limit of insertion of shaft $A_1$ of the arm A and forms a stop for the pivoting of block 22 to its open position of FIG. 2.

The surface of block 22 has a cylindrical protrusion 32, which engages in a corresponding seat 34 provided in a corresponding position in end 30 of shaft $A_1$. At a position on the opposite side thereof of seat 34, shaft $A_1$ has a cylindrical projection 36, which engages in seat 38 provided in end wall 24 of body 16. The mutual correct positioning of the components is thus assured.

At entrance opening 39 of body 16, into which shaft $A_1$ extends, are resilient spring fins 40 arranged opposite each other. Near their longitudinal edges (see FIG. 5), fins 40 terminate in wedge-shaped projections 42, which are also arranged opposite each other and which help to clamp shaft $A_1$. Wedge-shaped projections 42 form, with end wall 24 of body 16, a housing, which holds both end 30 of shaft $A_1$ and an elastic tongue 44, which is firmly connected to block 22.

The longitudinal edges 31 of tongue 44 are shaped to be received by and to press apart and move past wedge-shaped projections 42. The free end portion 45 of tongue 44 meets tongue 44 at an angle of less than 180° and is formed as an engagement member by which block 22 is pivoted, e.g. manually. With this structure, it is possible to easily remove and replace wiper B on arm A.

Wiper B is positioned by introducing end 30 of arm A through entrance 39 and into the opening provided in body 16 between wall 24 and block 22 when block 22 is in the open position (see FIG. 2), until end 30 engages abutment 25 on end wall 24.

When tongue 44 is operated, block 22 pivots counterclockwise around pin 20 and engages the tongue between two wedge-shaped projections 42. Pressure applied to tongue 44 through its shaped end 45 forces elastic fins 40 apart. As soon as the trailing face of tongue 44 passes projections 42, the elasticity of fins 40 returns projections 42 to their initial positions, and locks end 30 of shaft $A_1$, without play, in body 16. Any possible play between end wall 24 of body 16 and surface 28 of block 22 is taken up by the spring action of tongue 44.

The removal of wiper B from arm A is effected in a similar manner. Tongue 44 is disengaged from wedge-shaped projections 42 through pivoting shaped end 45 of tongue 44 clockwise. This separates fins 40 and permits block 22 to pivot until the free end of surface 26 engages abutment 25. It is thus possible to remove the body 16, which holds wiper B, from end 30 of arm A.

In the variant shown in FIGS. 1b, 2b, 3b and 4b, the box body 16b is shaped such that its two side walls 49 cover the outside of side walls 14b of support frame 12b, while block 22b has a T-shaped cross-section. Block 22b is fixed in slot 46 of frame 12b by means of a stem 48 and the various parts are held in pivotable manner by pin 20b.

Slot 46 is provided above frame 12b and has within it two inward facing bends 47 at the ends of side walls 14b of frame 12b. This arrangement provides a greater transverse strength for box body 16b than in body 16 of FIGS. 1 to 4.

Basically, the device of the invention consists of only three parts, namely the box body 16 or 16b, the block 22 or 22b, and the pin 20 or 20b. These parts and in particular the block and the box body can advantageously be made at least in part of molded plastic material, e.g. polyamide resins, with all the advantages as to processing and quietness of the device when in operation.

Modification and variants in accordance with the particular requirements of use of wiper B can be made in the device. Even these variants remain within the scope of the present invention. Therefore, the invention should be limited, not by the disclosure herein, but only by the appended claims.

I claim:

1. Device for removably connecting a wiper blade to the arm of a vehicle windshield wiper; said wiper including a support body having an end wall; said body having an entrance into which the end of the wiper arm is introduced; a latching element including an engagement surface movable between a locking and an unlocking condition, which respectively clamps and unclamps an end of the wiper arm against said body end wall; operable locking members connected with said body to latch said element against the wiper arm and the arm against said end wall; said locking members being resilient to spread to permit passage of said latching element, and thereafter snap back after that said element passes.

2. Device for removably connecting a wiper blade to the arm of a vehicle windshield wiper; said wiper including a support body having an end wall; said body having a wall for limiting the movement of a latching element; a latching element including an engagement surface movable between a locking and an unlocking condition, which respectively clamps and unclamps an end of the wiper arm against said body end wall; in said locking condition, said engagement surface being parallel to and opposite said body end wall; said latching element having a second surface which is adapted to abut said other wall of said body to limit the movement toward the unlocking condition of said latching element ; operable locking members connected with said body to latch said element against the wiper arm and the arm against said end wall.

3. Device according to claim 1, wherein said latching element includes an elastic tongue, which is positioned and adapted to engage said locking members near said body entrance for said wiper arm.

4. Device according to claim 3, wherein said tongue is composed of at least two contiguous sections which are differently oriented, said body end wall, and are at an angle of less than 180°, so as to increase the elastic action exercised by said tongue on said end of said wiper arm.

5. Device according to claim 3, wherein in the vicinity of said wiper arm entrance, said body includes spring fins which include wedge-shaped projections facing each other for engaging the edges of said tongue as it passes therebetween.

6. Device for removably connecting a wiper blade to the arm of a vehicle windshield wiper; said wiper including a support body having an end wall; a latching element formed of elastically deformable material, and pivotally mounted to said body; said latching element including an engagement surface pivotable between a locking and an unlocking condition, which respectively clamps and unclamps an end of the wiper arm against said body to latch said element against the wiper arm and the arm against said end wall, wherein said body encloses a portion of said wiper blade to which it is secured and said latching member has a T-shaped cross-section, with the stem of the T being the portion thereof that is pivotally mounted.

7. Device according to claim 6, wherein said secured wiper blade portion has free ends, which are bent toward each other.

8. Device according to claim 3, wherein said tongue terminates in a part adapted to be grasped for enabling disengagement of said end of said wiper arm from said latching members.

* * * * *